No. 771,573.

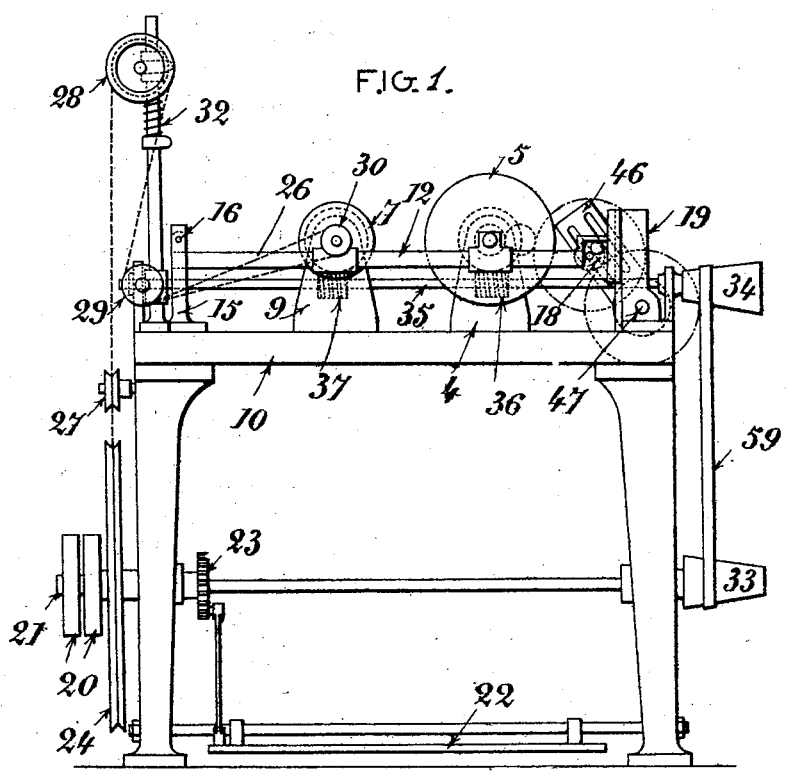

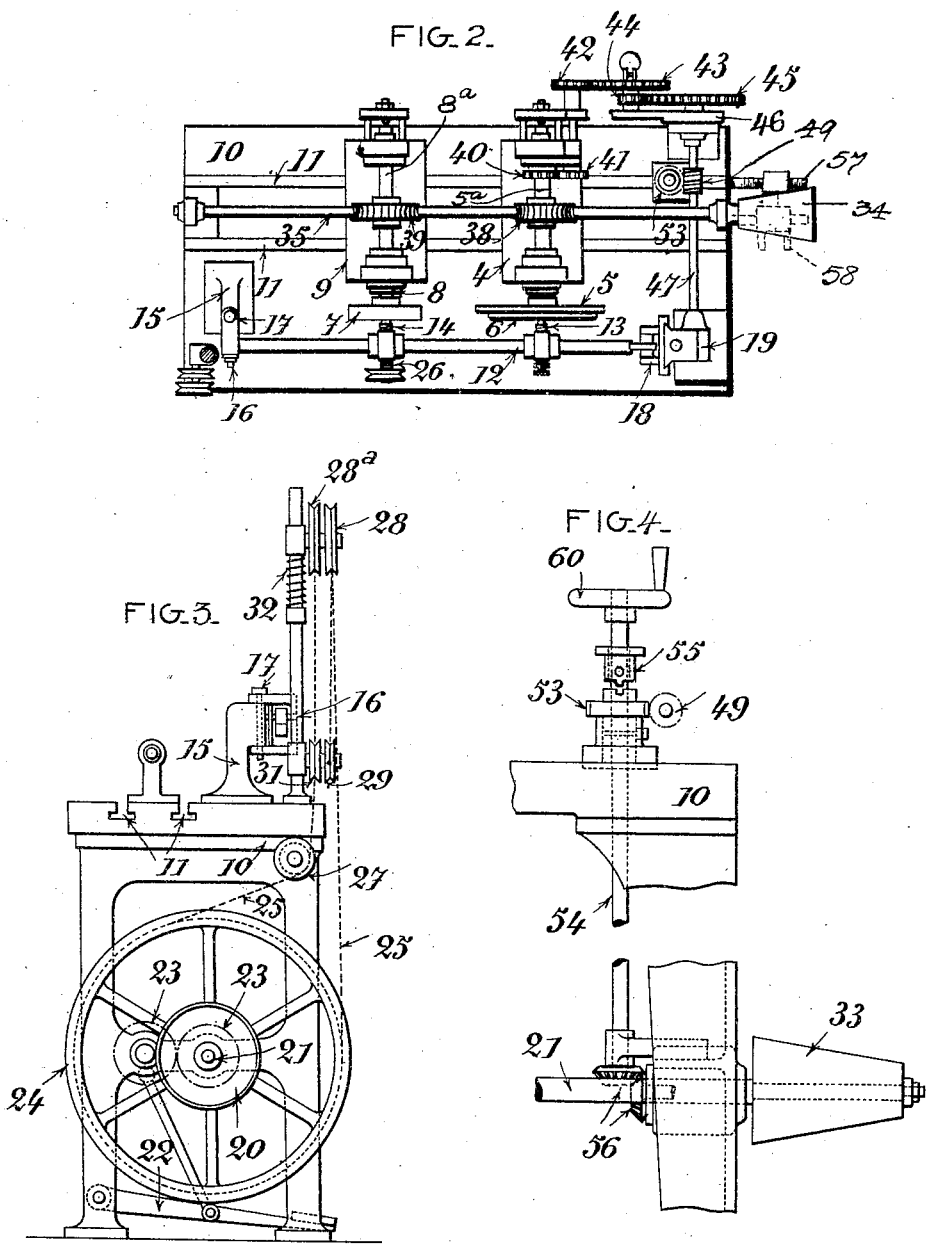

Patented October 4, 1904.

UNITED STATES PATENT OFFICE.

ALBERT POURLIER, OF GOURNAY-EN-BRAY, FRANCE.

PANTOGRAPHIC ENGRAVING-MACHINE.

SPECIFICATION forming part of Letters Patent No. 771,573, dated October 4, 1904.

Application filed November 10, 1902. Serial No. 130,792. (No model.)

*To all whom it may concern:*

Be it known that I, ALBERT POURLIER, manufacturer, a citizen of the Republic of France, residing at Les Grands Jardins, at Gournay-en-Bray, Seine-Inférieure, in the Republic of France, have invented certain new and useful Improvements in Pantographic Engraving-Machines, of which the following is a specification.

The invention includes the features hereinafter described, and particularly pointed out in the claim.

Figure 5:
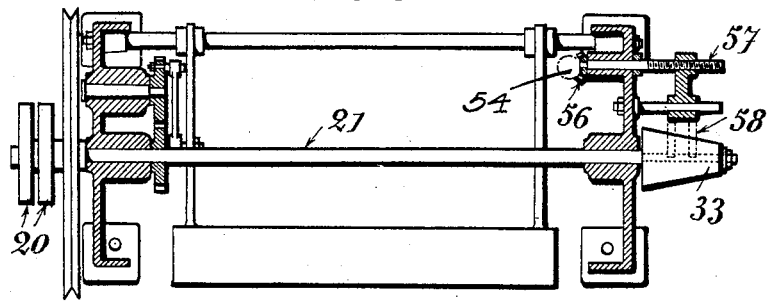
Figure 6:
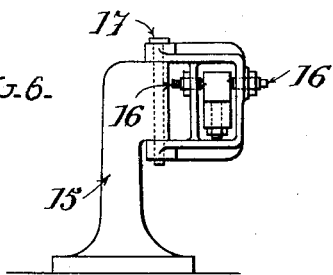
Figure 7:
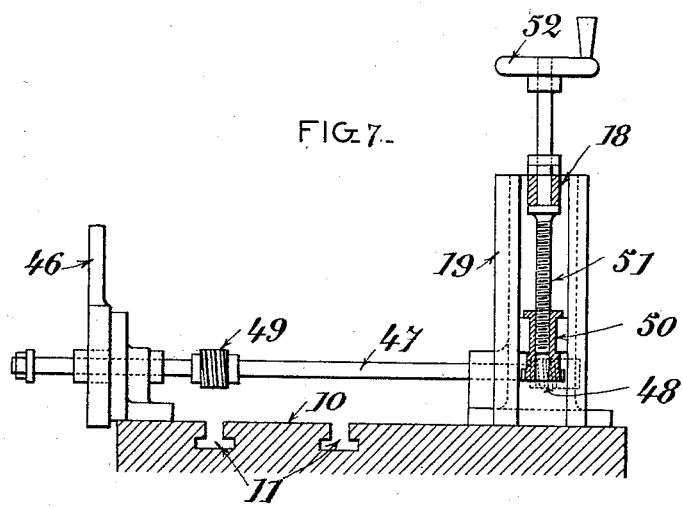

In the accompanying drawings, which show one form in which my invention can be carried out, Figure 1 is a front elevation of the reproducing-machine. Fig. 2 is a plan view of the same. Fig. 3 is a left-hand side elevation of the machine, and Figs. 4 to 7 are detail views of the machine.

The machine shown in Figs. 1 to 7 comprises a stock 4, provided with a plate 5, mounted to rotate with shaft 5ª and on which is fixed a model in hard material 6. The plate or other article to be engraved, 7, is fixed in a mandrel 8 on shaft 8ª of the stock 9. The main frame 10 of the machine is provided with slideways 11, which allow of fixing the stocks in different positions, according to the reduction desired. In front of the two stocks is located the bar-pantograph 12, provided with a carriage having a tracer 13 and with a carriage having a cutting device 14, intended to engrave the plate 7. The pantograph 12 is carried on one side by a support 15 by means of a double knuckle 16 and 17 (see Fig. 6) and on the opposite side by a carriage 18, sliding on the support 19.

The machine is operated by means of either loose and fixed pulleys 20, mounted on the main driving-shaft 21, or of the treadle 22 through the medium of the pinions 23. The shaft 21 is also provided with a grooved pulley 24, which transmits the motion through an endless rope to the shaft 26 of the cutting or engraving device 14. The said rope passes over a series of pulleys 28, 29, 30, 31, 28ª, and 27, so arranged that the transmission is regulated according to the movement of the stock 9. The rope is kept under tension at all times by means of a spring 32, which tends to move the pulleys 28 and 28ª upward. The shaft 21 is also provided with a conical drum 33, which transmits the motion by means of a belt 59 to the conical drum 34, fixed on the intermediate shaft 35. On the said shaft 35 are fixed two worms 36 and 37, which operate the wheels 38 and 39 of the stocks 4 and 9. The shaft of stock 4 carries a pinion 40, which operates a train of gear-wheels 41 42 43 44 45, the last three of which are carried by a slidable support 46 and which serve to transmit the motion to a shaft 47, provided with two worms 48 and 49. The worm 48 operates the nut 50 of a screw 51, (see Fig. 7,) which serves to produce the automatic descent of the pantograph-carriage 18. The return of the pantograph to its uppermost position is obtained by means of a hand-wheel 52, fixed to the screw 51.

The worm 49 operates a pinion 53, which can be made to move with the shaft 54 by means of a clutch 55. (See Fig. 4.) The said shaft 54 operates, by means of the pinions 56, the screw 51, carrying a carriage having a fork 58, which moves the belt 59 on the conical drums 33 and 34 when the machine is in operation. (See Fig. 5.) A hand-wheel 60, fixed on the shaft 54, serves to produce the rapid return of the belt 59. For that purpose the clutch-sleeve 55, having been previously disconnected and the drum 33 having been given a few revolutions, all that need be done to move the belt as desired is to turn the fly-wheel 60 in the proper direction.

The result of the arrangements above described is that the tracer 13 is caused to move downwardly as the screw 51 causes the carriage 18 to move down and while the model is turning with the plate 5 under the operation of the worm 36. At the same time the engraving device 14, which is moved geometrically the same as the tracer 13 and which turns under the action of the endless rope 25, engraves the plate 7 while the latter is turning at the same speed as the model 6.

The rate of rotation of the model and the plate to be engraved is automatically and progressively reduced as the engraving, begun at the center, moves farther toward the periphery through the instrumentality of the automatic movement given to the belt 59 on the conical drums 33 and 34.

The automatic downward movement of the pantograph is at all times proportional to the rotation of the shaft of stock 4, so that the pitch of the helix or spiral line traced by the tracer 13 on the model 6 remains the same at all times. It can be regulated by changing the gear-wheels mounted on the support 46.

When it is desired to operate the machine by the foot, the belt-pulleys are put out of gear. On the other hand, when the machine is operated by these belts the treadle is put out of gear.

Having thus described my invention, what I claim is—

In a machine of the class described, the combination with the supporting frame or table, of a pantograph-bar pivoted to swing in a vertical plane, a main driving-shaft, a transverse shaft at the end of the table, variable driving connections from the main driving-shaft to said transverse shaft, means whereby the rotation of said transverse shaft raises the free end of the pantograph-bar, a worm on said transverse shaft, a vertical shaft having a worm-wheel engaging said worm, a belt-shifter for shifting said variable drive connections, a rotatable rod having a threaded portion engaging a correspondingly-threaded portion of said belt-shifter, and bevel-gears connecting said rod and vertical shaft, substantially as described.

In testimony that I claim the foregoing as my invention I have signed my name in presence of two subscribing witnesses.

ALBERT POURLIER.

Witnesses:
 EDMOND BLÉTRY,
 MAURICE ROUX.